United States Patent Office 3,435,171
Patented Mar. 25, 1969

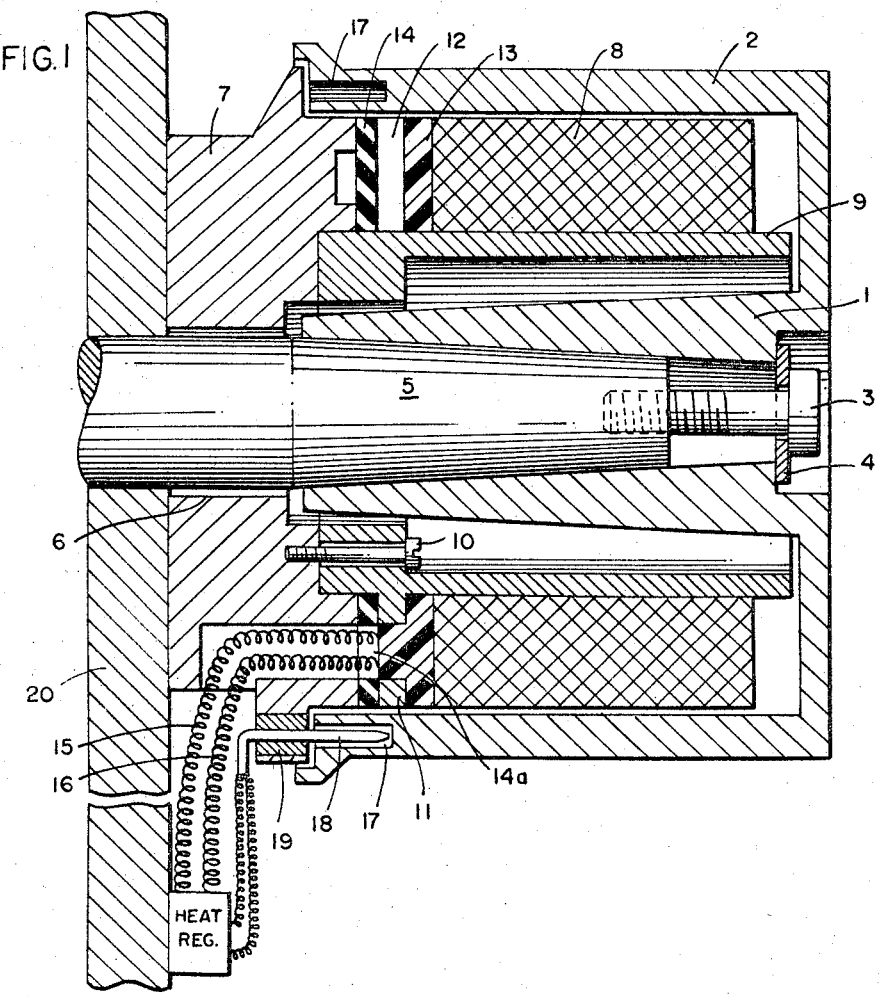
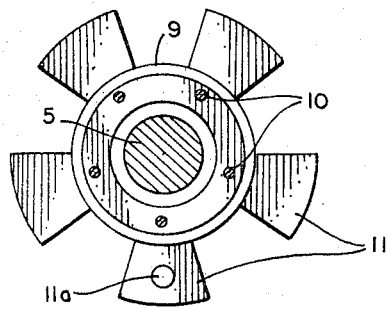

3,435,171
HEATED GALETTE
Hans Lohest, Remscheid-Lennep, Germany, assignor to Barmag Barmer Maschinenfabrik AG, Wuppertal, Germany
Filed Nov. 29, 1966, Ser. No. 597,580
Claims priority, application Germany, Dec. 3, 1965, B 84,808
Int. Cl. H05b 5/08
U.S. Cl. 219—10.61
4 Claims

ABSTRACT OF THE DISCLOSURE

An adjustably heatable galette for thread conveying apparatus in which the cylindrical wall of a hollow galette is mounted for rotation by means connecting the outer end thereof to an axial drive shaft journaled in a supporting frame, the inner annular end surface of the galette wall facing the frame containing an annular slot to receive a heat sensitive measuring element, the galette wall being heated by means of an adjustable induction heating means comprising an annular flanged cylindrical coil carrier wound with an induction coil adjacent the flanged portion thereof, the entire induction coil assembly being connected in fixed position on the supporting frame.

---

Galettes, sometimes called "godets," are rollers normally rotated around their axis of rotation so as to convey filaments, threads or yarns wound thereon, in particular in stretching devices or texturing devices, especially for heat-treating synthetic filaments. Idly running guide rollers, driven only by the threads wound around them, are used together with the galettes. Generally, the axis of rotation of such a guide roller positioned at a short distance from the galette is inclined in such a manner that its axis of rotation or its imaginary elongation cuts or crosses that one of the galette at an acute angle. Simultaneously, heated galettes supply the circumferential or outer running surface in contact with the filaments or threads with the heat necessary for plastic deformation or fixation of such threads.

Internally heated as well as externally heated galettes are known. The heat is usually produced by means of electrical resistance heating or inductive heating, by steam or a hot liquid or by infrared radiation. For example, as disclosed in French Patent 1,348,801, an adjustably heated galette has been described in which an electrical resistance filament is rigidly connected with the frame of the machine and extends deeply into the galette, the axis of rotation of which extends concentrically through the block of the resistance filament without touching it. Imbedded in a so-called insert, a heat-sensitive measuring element, consisting of two different elements, is on one side inserted into the outer wall of the resistance block and on the other side drags against the inner wall of the cylindrical galette body. This means that the heat-sensitive measuring element is installed between the heating block and the galette and that the distance from the block as the heat source to the place of effectiveness of the heat at the outer circumference of the galette is larger than the distance from the block to the heat-sensitive measuring element. To be sure, the insert is heat-insulated from the resistance heating block, but as is well known, there can be no perfect thermal insulation in the long run and especially within the limited space inside the galette. The temperature values measured by the heat-sensitive measuring element are relayed over current conducting lines to a regulator which in turn controls the electrical energy to be supplied to the resistance filament, so as to maintain the temperature of the galette heated in such a manner and, through the galette, the temperature of the insert which is being measured by the heat-sensitive measuring element.

It will be evident that the disadvantage of this known arrangement consists of the fact that the temperature measured in the insert and relayed to the regulator differs considerably from the temperature which actually prevails at the outer circumferential surface of the galette. This adulteration or difference of measured temperature values is increased even further by the fact that the heat is developed and dams up inside the galette while the surface of the galette experiences a cooling due to air flowing around it. The most essential source of error in this known system, however, is the frictional heat caused by the scraping of the stationary insert which is spring urged against the rotating inner wall of the galette so that the galette wall bears directly in moving contact with the heat-sensitive measuring element. Such a construction is especially disadvantageous because the frictional heat depends proportionally upon the number of revolutions of the galette, thus having a variable influence on the measured temperature. When the number of revolutions of the galette changes, it would be essential to adjust the regulator to compensate for the difference of frictional heat, but this is complicated and time-consuming. Beyond this, possible variations of the number of rotations during continuous operation result in uncontrollable variations in temperature measurement which cannot be counterbalanced. Finally, the wear of galette and insert at their points of contact and the maintenance required thereby are quite undesirable imperfections.

An adjustably heated galette has also previously been described in which the heating element as well as the heat-sensitive measuring element and even the regulator rotates with the galette. However, if an adjustment of the regulator becomes necessary, the entire thread conveying apparatus or at least the particular galette must be shut down for this purpose. A further disadvantage consists in the fact that the electrical current for heating and temperature regulation must be supplied over a sliding ring and carbon brushes. Wear, corrosion and contamination at the points of contact cause interruptions in the current supply for the heating and regulation system. In addition to this, such an installation requires close attention and time-consuming maintenance whereby it is often necessary to shut down the entire apparatus with all of its galettes.

Heated galettes are also known in which the measured temperature values are received over sliding rings from a heat-sensitive element rigidly installed in the galette and relayed to the regulator. In view of the low amperage of such measuring currents, the fluctuations caused by the sliding ring itself have an especially disturbing and adulterating effect and prevent an accurate relay and control of temperature values.

On the other hand, other systems have been tried in which the temperature of the heating device attached to the supporting frame of the apparatus is scanned at this heating device itself and relayed to the heat regulator. It is self-evident that the temperatures measured at the source of the heat represent only very poorly comparable values for the temperatures actually prevailing at the outer circumference of the galette, particularly because variable operating conditions cause a fluctuation in heat flow in the galette.

It is therefore an object of the invention to provide an adjustable heated rotatable galette for thread conveying apparatus provided with a heat-sensitive measuring element constructed in such a manner that it delivers the most precise and unadulterated temperature data possible to the heat regulator whereby the surface of the galette touching the thread always receives an amount of heat to accurately maintain the required temperature for the treatment of the thread.

It is a further object to also provide a heated galette wherein the individual elements for measuring and controlling the galette temperature are arranged so as to be as maintenance-free and easily accessible as possible. These elements, however, are also to be constructed and arranged so that they do not hinder the joining of the thread onto the galette or prevent the continuous operation of the galette in any manner.

It has now been found, in accordance with the invention, that a substantial improvement for regulating the supply of heat to the galette rotatably mounted on a stationary supporting frame of thread conveying apparatus can be achieved by providing a galette having a substantially cylindrical outer wall concentric to its axis of rotation, the end surface or annular face of said wall facing said frame being constructed so as to contain an annular slot concentric with the axis of rotation of the galette such that the slot extends into the outer wall of the galette in proximity to the outer surface thereof which is in running contact with a thread being conveyed or carried by the galette. A heat sensitive measuring element is mounted on the supporting frame so as to fit into the annular slot while remaining free of contact with the galette, and adjustable heating means responsive to the heat sensitive measuring element must also be arranged to supply a controlled amount of heat internally of the galette while remaining free of contact therewith. While any conventional heating means can be used to furnish a controlled supply of heat internally of the galette, it is especially desirable for purposes of the present invention to insert an induction coil inside the galette in a position concentric to the axis of the galette with suitable means connecting the coil to the supporting frame. The induction coil is thus adapted to heat the outer wall of the galette while remaining free of actual contact therewith, and the amount of heat developed in this wall by the coil can be controlled with a conventional heat regulator mounted externally of the galette.

One example of the construction of the adjustably heated galette according to the invention is illustrated in the accompanying drawing wherein:

FIG. 1 is a cross-sectional view of the galette through its axis of rotation with some elements shown schematically; and FIG. 2 is an end plan view of the coil carrying element shown in FIG. 1 reduced in size merely to illustrate its annular construction.

Referring now to the drawing, an axial supporting collar or sleeve 1 is spaced radially inwardly from the outer wall structure 2 of a typical cylindrical galette so as to provide a relative large open or hollow space within the body of the galette. This collar 1 is rigidly mounted on the conical end of the drive shaft 5 by means of the screw or bolt 3 and washer 4. The drive shaft 5 is rotatably mounted in the supporting frame 20 of the thread conveying apparatus. The shaft 5 is passed through a bore 6 in the cylindrical mounting plate or base support 7 attached to the frame 20 by any suitable means such as screws or bolts (not shown). This mounting plate 7 is positioned concentrically just inside the open end of the galette but is free of contact with the galette itself including outer wall structure 2 and the axial collar 1. An induction coil 8 is wound on the hollow cylindrical coil carrier 9 which in turn is rigidly held on the mounting plate 7 by screws or bolts 10 and surrounds the collar 1 of the galette 2. Both the carrier 9 and the induction coil 8 are also positioned concentrically within the galette so as to avoid any contact therewith.

The coil carrier 9 possesses a collar-like ring 11 which contains several slots 12 uniformly distributed around its circumference as further shown in FIG. 2. At least one of the resulting ring projections 11 contains an opening 11a for passage of electrical lines 15 and 16 to the induction coil 8. The induction coil 8 is joined to the ring 11 and closed by a conventional casting resin 13. Between mounting plate 7 and ring 11, there is inserted a thermally insulating material as an annular ring layer 14 which also has an opening 14a for the electrical lines 15 and 16. The feed current is thus supplied to the induction coil 8 via the lines 15 and 16. The outer jacket or surface of the coil 8 and the inner wall surface of the galette 2 are separated from one another by a thin air layer.

According to the invention, an annular slot or groove 17 is cut into the ring-shaped front surface or annular end face of the galette 2 so deeply that it extends into the field corresponding to the lines of force originating from the induction coil 8. The heat-sensitive measuring element 18 is seated rigidly in the mounting plate 7 by means of the holder or plug 19 and extends outwardly so as to fit into the annular slot 17 that it axially overlaps the field of the induction heating coil which is created in the galette wall 2. A thermistor, resistance thermometer, thermocouple element or any equivalent device responsive to changes in temperatures may be used as heat measuring element, but in any case it must fit into slot 17 in proximity to and without contacting the galette wall 2.

The lines of force originating from the induction coil 8 pass through the cylinder wall of the galette 2 and heat it. The temperature which is effective on the measuring element 17 is relayed by this element as electrical data by lines 15 and 16 to a conventional regulator mounted on the frame 7 or positioned at any accessible place remote from the galette. The temperature at the outer circumferential surface of the galette 2 acting upon the conveyed thread corresponds quite closely to the temperature measured by element 17 and the relayed data can be used in known manner in the regulator as a comparative value for the control of the feed current to the induction coil 8.

In comparison with known devices for adjustably heating the galette, the combination according to the invention has the advantage that the heat-sensitive measuring element receives the temperature at a point in the galette at which the same or practically the same conditions prevail with regard to the supply of heat as on the peripheral surface of the galette over which the thread runs. A further advantage consists in the fact that the heat-sensitive measuring element contacts neither the rotating galette nor any other moving parts. Furthermore, no sliding rings, brushes or other moving parts are necessary for the relay of data or for the supply of current to the primary heating device such as the induction coil. Undesirable influences on the measurement and relay of temperature, for example when the rotational velocity of the galette is changed, are consequently completely avoided by the present invention because no uncontrollable frictional heat, no wear and no disturbing corrosion can occur. Accordingly, the required maintenance, replacement or repair of individual elements or parts is quite insignificant. In case the galette is dismounted, the heat-sensitive measuring element may remain in its place. The position of this measuring element in no way interferes with such dismounting nor does it interfere during the application or removal of the thread onto the galette.

In order to guarantee that the induction coil receives the electrical energy necessary for maintaining the desired temperature, even with possible changes in the operating conditions, it is especially desirable according to the invention to electrically connect the heat-sensitive measuring element to a heat regulator mounted separately and in a stationary manner in the supporting frame of the apparatus. This arrangement has the advantage that the regulator itself is easily accessible and can be adjusted at any time, even when the apparatus is running. In this respect, it should be noted that the supporting frame is preferably a unitary structure, but it may also be made up of several distinct parts joined together or located separately from each other. Likewise, while it is desirable to rigidly mount all elements other than the means for rotating the galette and the galette itself, it will be understood that such all elements can be adjustably mounted or arranged for easy replacement, and it is also possible to use resilient mountings or cushions to dampen vibrational effects on the non-moving parts.

The results most precisely showing the actual temperature condition at the circumferential surface of the galette are obtained for an inductively heated galette if the heat-sensitive measuring element extends into the field corresponding to the lines of force of the induction coil. Since the lines of force proceeding from the induction coil flow directly through the wall of the galette and consequently produce heat directly within the wall itself, the maximum accuracy of temperature measurement is obtained in the wall structure. Surprisingly, no noticeable fluctuations or adulterations of the temperature measurement results even though induction in the measuring element itself takes place. While an air gap exists around the measuring element, it is a relatively enclosed space from which heat is not quickly carried and actually remains quite uniform. Cooling of the heat-sensitive measuring element owing to heat dissipation through its electrical lines outside of the galette can be easily counteracted by heat insulation in the mounting stud of the measuring element. Finally, any difference in temperature on the galette outer surface and that measured in the annular slot is sufficiently constant so that compensation can be made in the adjustment of the heat regulator.

The adjustably heated galette of the invention is particularly useful where synthetic threads must be accurately heated while running in contact with the outer surface of the galette, and the particular combination of parts can be readily adapted to conventional thread conveying apparatus. Since most commercial operations require a large number of galettes mounted in banks or tiers, the present invention lends itself to a much more economical and, if desired, an almost fully automated operation.

The invention is hereby claimed as follows:

1. In a thread conveying apparatus having a heated galette rotatably mounted on a stationary supporting frame, the improvement comprising:
   a hollow galette having a substantially cylindrical wall concentric to its axis of rotation, the annular end surface of said wall facing said frame containing an annular slot concentric with said axis of rotation such that said slot extends into said wall in proximity to the outer surface thereof, and connecting means joining the outer end of said galette wall away from said frame to an axial drive shaft rotatably mounted on said frame;
   a heat sensitive measuring element mounted on said frame to fit into said annular slot while remaining free of contact with said galette; and
   adjustable induction heating means responsive to said heat sensitive measuring element and arranged to develop a controlled amount of heat internally of said galette cylindrical wall while remaining free of contact therewith, said induction heating means including an annular flanged cylindrical coil carrier mounted in a fixed position on said frame and extending concentrically within said galette around said drive shaft at a radially spaced distance from said shaft and an induction coil wound around said coil carrier adjoining the flanged portion thereof.

2. An apparatus as claimed in claim 1 wherein the flanged portion of said coil carrier is radially slotted.

3. An apparatus as claimed in claim 1 wherein said adjustable heating means includes a heat regulator mounted externally of said galette, said regulator having adjustable temperature control means responsive to said heat sensitive measuring element to regulate the amount of heat developed in the outer wall of said galette by said induction coil.

4. An apparatus as claimed in claim 1 wherein said heat sensitive measuring element extends into the field corresponding to the lines of force developed by said induction coil.

References Cited

UNITED STATES PATENTS 3,280,305  10/1966  Burdge et al. _____ 219—469

FOREIGN PATENTS 858,855  1/1961  Great Britain.

RICHARD M. WOOD, *Primary Examiner.*

L. H. BENDER, *Assistant Examiner.*

U.S. Cl. X.R.

219—471